July 10, 1934.  E. REISS-SCHMIDT  1,966,141
PROCESS FOR THE MANUFACTURE OF SELF ILLUMINATING SIGNS
Filed Feb. 28, 1933
Figur 1
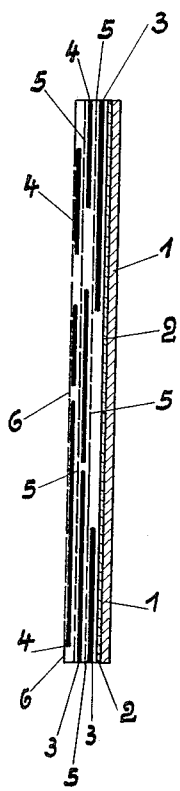
Figur 2
Inventor:

Patented July 10, 1934

1,966,141

UNITED STATES PATENT OFFICE 1,966,141

PROCESS FOR THE MANUFACTURE OF SELF-ILLUMINATING SIGNS

Ernst Reiss-Schmidt, Buderich, near Neuss-on-the-Rhine, Germany, assignor, by mesne assignments, to Konrad Prothmann, Detroit, Mich.

Application February 28, 1933, Serial No. 659,019
In Germany September 11, 1931

3 Claims. (Cl. 41—22)

This invention relates to self illuminating signs which are made by applying the picture or the reading matter to a mirror-like reflecting surface with the aid of highly transparent colours. For this purpose a pane of glass or a similar transparent carrier has been hitherto arranged on the reflecting surface and to this pane the transparent colour was applied. Such pictures have been called "self illuminating" inasmuch as they show very brilliant lights by mirror reflection.

According to my invention the self illuminating pictures, legends or symbols are not applied, as hitherto known, to a pane of glass or to a similar transparent carrier, but are painted, sprayed or printed by a printing process known per se in the art, directly upon a brilliant and polished metal sheet or upon a metal foil, upon metal paper or a similar reflecting base in highly transparent colours or highly transparent varnishes. The reflecting surface provided with the highly transparent colours is then subjected to a mechanical treatment for instance by stamping or rolling, in order to provide the reflecting base with a plurality of regularly or irregularly divided unevennesses, for instance with ribs, grooves or corrugations covering the whole surface.

By this treatment, on the one hand the light reflection of the picture carrying surface is considerably increased, on the other hand the blinding effects which may be produced by the high polished base are prevented by the mechanical treatment.

At the same time, by the projections the angle of sight in which the picture appears bright and lightening to the looker on is considerably increased.

In order to achieve a good fixing of the colours on the refractory metal base, the base may be prepared before applying the colours with a highly transparent colourless or slightly coloured varnish of good covering power, for instance with an oil varnish, with resin or cellulose lacquer. Upon such layer the transparent colours of different compositions and qualities will fix and dry excellently.

In this manner practically all highly transparent colours e. g. organic or mineral colours with sufficient fastness may be used, for instance unfading Indanthren colours solved in spirit or emulsified in oil, aniline colours of the category of fastness No. 1, algol colours and others, also mineral colours, e. g. finely ground lustre colours and glazing colours as blue verditer, cadmium yellow, mineral blue, malachite green and many others.

With regard to variety and gradation of the tones of coloration it is most advantageous to apply the colours in different layers one upon another, the layers being separated from each other by highly transparent colourless or slightly coloured intermediate layers of varnish. By this way it is possible to produce many different tones of coloration in all gradations by the complex optical effect of the layers, whilst when the coloured layers are in direct touch with each other or when the colours are mixed previously, the light fastness is damaged and the colours become dull.

The intermediate layers are advantageously made of clear commercial varnish, light resin solutions as resin—or manila varnishes, dull wax varnishes, cellulose lacquers, e. g., solutions of nitrocellulose, cellulose esters—and ethers or mixtures of such compounds.

Pictures made in this manner may be provided with a transparent covering plate for instance of glass or may also be used without the same, particularly when covered with a special transparent layer of varnish. This layer is advantageously applied only after the mechanical treatment of the pictures has been finished, in order to avoid any damage by mechanical strains. Such self illuminating picture signs are water proof also without glass cover and may be therefore used for out of door advertisements in the open air. It is preferred that both the single colour layers and the covering protecting varnish layers are dried in a drying oven at a temperature of between 60 and 120° C. in order to achieve a hard enamel like structure of the coloured and covering layers.

The application of the transparent colours and varnishes may easily be accomplished by covering the corrugated or ribbed or otherwise treated or stamped reflecting surfaces with a flexible stencil made of celluloid, tin foil, thin sheet metal, card and the like, and then applying the colour by spraying or with a paint brush into the stencil openings. Or the stencil may be adapted by stamping or manual application of the grooves or ribs to the reflecting base in order to achieve sharp tracings of the coloured surfaces.

It has been found that the breadth of the ribs or grooves of the mirror reflecting surface must preferably not exceed 15 mm. at most, so that the uniform plastic impression is neither spoilt nor prevented. If the breadth is less, for instance 10–12 mm., the sign will appear like a luminous glass sign, so that it does not seem any more to be a cheap metal sheet sign.

The grooves or ribs are preferably shaped in different forms, according to whether a daylight sign or a refracting sign, e. g. for reflector-lightings is required.

Likewise the rib layers must be adapted in accordance with the light conditions.

For the purpose of this invention, sheets coated with chromium or chromium steel sheets polished and provided with the unevennesses mentioned, or nickel-silver-aluminium alloys have proved to be most advantageous. Yet cheaper sheets provided with high polish may be used as well.

The single parts of the self illuminating sign according to the invention are illustrated by way of example in the accompanying drawing:

Figure 1 shows a metal sheet 1 in section, upon the highly polished side of which a transparent varnish layer 2 is applied, this layer carrying the picture in transparent colours and several layers 3 and 4 one lying upon the other with intermediate transparent varnish layers 5. The sign is then provided with ribs by stamping to receive the shape shown by the vertical section in Figure 2. Now another varnish protecting cover 6 may be applied to the transparent picture. The layers are drawn on enlarged scale for the purpose of clearness.

Various other modifications may be made and I do not limit myself to what is indicated by the specification and by the drawing except what is indicated in the subjoined claims.

Having now fully described my said invention I claim:

1. A process for the manufacturing of self-illuminating signs consisting in applying a mirror reflecting surface to one face of the body of the sign, then applying in highly transparent colors the desired picture or reading matter upon the reflecting surface, and finally subjecting the reflecting base to a mechanical treatment so as to provide the same with a plurality of light reflecting surfaces.

2. A process for the manufacturing of self-illuminating signs consisting in applying a mirror reflecting surface to one face of the body of the sign, then printing in highly transparent colors the desired picture or reading matter upon the reflecting surface, and finally subjecting the reflecting base to a mechanical treatment so as to provide the same with a plurality of light reflecting surfaces and finally covering the sign with a transparent finishing liquid.

3. A process as claimed in claim 2, including the additional step of subjecting the sign to a heat treatment to effect proper drying thereof.

ERNST REISS-SCHMIDT.